(12) United States Patent
Sharma et al.

(10) Patent No.: US 12,499,582 B2
(45) Date of Patent: Dec. 16, 2025

(54) COMPRESSING TEXTURE DATA ON A PER-CHANNEL BASIS

(71) Applicants: ADVANCED MICRO DEVICES, INC., Santa Clara, CA (US); ATI TECHNOLOGIES ULC, Markham (CA)

(72) Inventors: Saurabh Sharma, Santa Clara, CA (US); Laurent Lefebvre, Markham (CA); Sagar Shankar Bhandare, San Diego, CA (US); Ruijin Wu, San Diego, CA (US)

(73) Assignees: Advanced Micro Devices, Inc., Santa Clara, CA (US); ATI TECHNOLOGIES ULC, Markham (CA)

( * ) Notice: Subject to any disclaimer, the term of this patent is extended or adjusted under 35 U.S.C. 154(b) by 132 days.

(21) Appl. No.: 18/434,185

(22) Filed: Feb. 6, 2024

(65) Prior Publication Data

US 2024/0273767 A1 Aug. 15, 2024

Related U.S. Application Data

(63) Continuation of application No. 18/209,375, filed on Jun. 13, 2023, now abandoned, which is a
(Continued)

(51) Int. Cl.
*G06T 9/00* (2006.01)
*G06T 1/60* (2006.01)

(52) U.S. Cl.
CPC .............. *G06T 9/00* (2013.01); *G06T 1/60* (2013.01); *G06T 2200/04* (2013.01)

(58) Field of Classification Search
CPC ...................................................... G06T 9/00
See application file for complete search history.

(56) References Cited

U.S. PATENT DOCUMENTS

| 2009/0046207 A1 | 2/2009 | Salvucci |
| 2018/0096513 A1 | 4/2018 | Park et al. |

(Continued)

FOREIGN PATENT DOCUMENTS

| CN | 101536526 | 9/2009 |
| CN | 107660280 | 2/2018 |

(Continued)

OTHER PUBLICATIONS

Office Action issued in Chinese Application No. 202180065225.3, mailed Dec. 7, 2023, 15 pages.
(Continued)

*Primary Examiner* — Shivang I Patel

(57) ABSTRACT

Sampling circuitry independently accesses channels of texture data that represent a set of pixels. One or more processing units separately compress the channels of the texture data and store compressed data representative of the channels of the texture data for the set of pixels. The channels can include a red channel, a blue channel, and a green channel that represent color values of the set of pixels and an alpha channel that represents degrees of transparency of the set of pixels. Storing the compressed data can include writing the compress data to portions of a cache. The processing units can identify a subset of the set of pixels that share a value of a first channel of the plurality of channels and represent the value of the first channel over the subset of the set of pixels using information representing the value, the first channel, and boundaries of the subset.

20 Claims, 10 Drawing Sheets

Related U.S. Application Data continuation of application No. 17/716,186, filed on Apr. 8, 2022, now Pat. No. 11,694,367, which is a continuation of application No. 17/030,048, filed on Sep. 23, 2020, now Pat. No. 11,308,648.

(56) References Cited

U.S. PATENT DOCUMENTS

| | | | | |
|---|---|---|---|---|
| 2018/0293778 | A1* | 10/2018 | Appu | G06T 9/00 |
| 2019/0110056 | A1* | 4/2019 | Fenney | H04N 19/156 |

FOREIGN PATENT DOCUMENTS

| | | |
|---|---|---|
| CN | 109636865 | 4/2019 |
| CN | 111052172 | 4/2020 |
| EP | 1947860 | 7/2008 |
| JP | H10164589 | 6/1998 |
| JP | 2010109444 | 5/2010 |

OTHER PUBLICATIONS

Strom et al. "Floating-point buffer compression in a unified codec architecture," Graphics Hardware, 2008, 9 pages.
Levinthal et al., "Chap—a SIMD graphics processor" Computer Graphics, ACM, vol. 18, No. 3, 1984, 5 pages.
Extended European Search Report issued in Application No. 21873424.2, mailed May 29, 2024, 11 pages.
Office Action issued in Chinese Application No. 202180065225.3, mailed Apr. 27, 2024, 7 pages.
Korean Office Action mailed Jul. 31, 2025 for Application No. 10-2023-7012228, 71 pages.
Japanese Office Action mailed Jun. 17, 2025 for Application No. 2023-517659, 14 pages.

* cited by examiner

COMPRESSING TEXTURE DATA ON A PER-CHANNEL BASIS

CROSS-REFERENCE TO RELATED APPLICATIONS

The present application is a Continuation application of U.S. patent application Ser. No. 18/209,375, entitled "COMPRESSING TEXTURE DATA ON A PER-CHANNEL BASIS", and filed on Jun. 13, 2023, which is a Continuation application of U.S. patent application Ser. No. 17/716,186, entitled "COMPRESSING TEXTURE DATA ON A PER-CHANNEL BASIS", and filed on Apr. 8, 2022, now U.S. Pat. No. 11,694,367 issued on Jul. 4, 2023, which is a Continuation application of U.S. patent application Ser. No. 17/030,048, entitled "COMPRESSING TEXTURE DATA ON A PER-CHANNEL BASIS", and filed on Sep. 23, 2020, now U.S. Pat. No. 11,308,648 issued on Apr. 19, 2022, the entirety of each is incorporated by reference herein.

BACKGROUND

A graphics processing unit (GPU) typically processes three-dimensional (3-D) graphics using a graphics pipeline formed of a sequence of programmable shaders and fixed-function hardware blocks. For example, a 3-D model of an object that is visible in a frame can be represented by a set of triangles, other polygons, or patches which are processed in the graphics pipeline to produce values of pixels for display to a user. The triangles, other polygons, or patches are collectively referred to as primitives. The process includes mapping textures to the primitives to incorporate visual details that have a higher resolution than the resolution of the primitives. The GPU includes a dedicated memory that is used to store texture values so that the texture values are available for mapping to primitives that are being processed in the graphics pipeline. Textures can be stored on a disk or procedurally generated as they are needed by the graphics pipeline. The texture data stored in the dedicated GPU memory is populated by loading the texture from the disk or procedurally generating the data. The dedicated GPU memory is typically a relatively small memory, which limits the amount of texture data that can be stored in the dedicated GPU memory. The overhead required to populate the texture data can be significant, particularly if only a small subset of the texture data is used to render the final screen image. For example, textures are loaded from disk on a page-by-page basis even if only a small portion of the data in the page is used to render the image. The overhead problem is exacerbated in applications that create large numbers of intermediate textures while rendering a frame and these textures are repeatedly pulled from memory by different passes embedded in the frame. The creation and loading of textures from memory is therefore both a performance issue and a power issue for GPUs, at least in part because of an increasing gap between the computational throughput of a GPU and the available memory bandwidth.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

Figure 1:
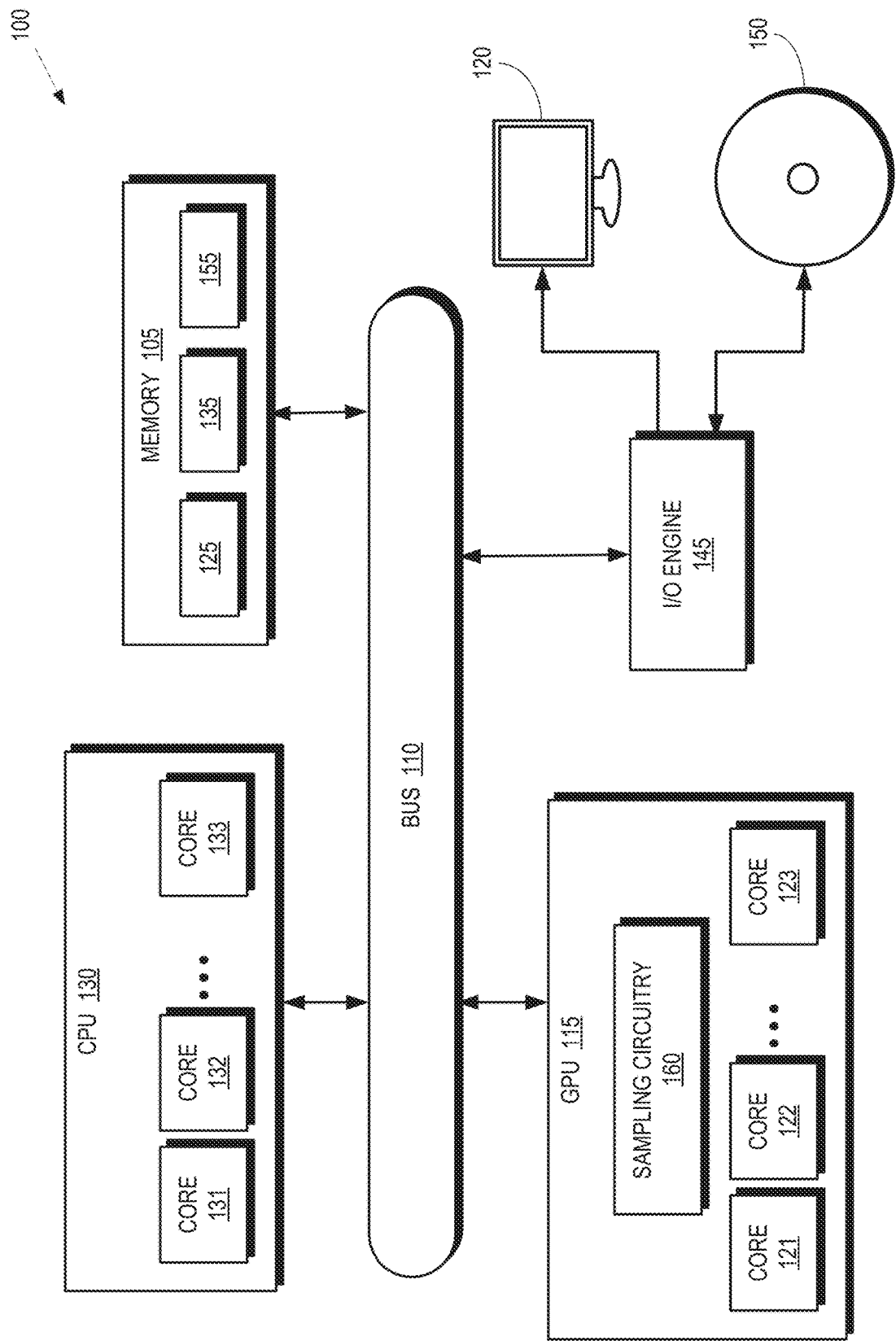
FIG. 1 is a block diagram of a processing system that compresses texture data on a per-channel basis according to some embodiments.

Conventional GPUs mitigate the issues caused by the gap between computational throughput and memory bandwidth using three approaches: (1) a large last level cache, (2) binning and rendering tiles that represent rectangular portions of the screen image, and (3) compressing textures at creation time. Larger caches balance or overcome the mismatch between throughput and bandwidth when the active working set of texture pixels is smaller than the capacity of the cache. However, large caches provide less benefit at higher resolutions (such as the 4K resolution used in many games) because higher resolutions produce larger active working sets and increased cache thrashing. Reducing the size of the tiles can suppress overlaps present in a 3D scene and rendering one tile at a time saves bandwidth at texture creation. However, this approach has minimal impact on the bandwidth required to read the textures necessary to render the scene. Moreover, tiled rendering does not change the number of screen space illumination passes or passes rendered by a compute shader. Compressing textures could save bandwidth for 3-D passes and compute shader passes, as well as conserving bandwidth at texture creation and consumption. However, the efficacy of texture compression depends on the locality characteristics of the texture data and high compression ratios are difficult to achieve for all the pixels used to render an image.

Texture data is compressed using first-order difference equations. A tile is compressed by selecting one pixel as a reference pixel and calculating differences (referred to herein as delta values) between a base value of the reference pixel and the values of other pixels. The number of bits required to encode the largest delta value (e.g., the worst case residue bits) is calculated and used to determine how to represent the delta values in memory. The pixels are subdivided into multiple channels such as red, blue, and green channels that combine to represent the color of the pixel and an alpha channel that represents a degree of transparency from opaque/black to transparent/white. The delta values are typically calculated on a per-channel basis. For example, delta values for the channels are calculated by comparing the values of each channel in the reference pixel to the values of corresponding channels in the other pixels. The channels have different locality characteristics (or include more or less high frequency data) and so the delta values and worst-case residue bits vary among the channels. Moreover, the pixels that represent a texture are typically stored in memory according to their spatial distribution so that values of the channels of one pixel are followed by the values of channels for the next pixel, etc. The compression ratios for the texture data is therefore governed by the channels that have the highest entropy, e.g., the pixels with the lowest degree of locality and largest amount of high frequency data. For example, if the red and blue channels of a pixel include high entropy data and the green and alpha channels of the pixel have low entropy data, e.g., data with a high degree of locality that could potentially produce very high compression ratios, the overall compression ratio for the pixel is limited to the (relatively low) compression ratio achievable in the red and blue channels.

FIGS. 1-10 disclose embodiments of techniques that increase the efficacy of texture data compression by compressing channels of the pixels of texture data separately. A pixel of texture data is represented by a plurality of channels such as a red channel, a blue channel, and a green channel that represent corresponding color values of the pixel and an alpha channel that represents a degree of transparency of the pixel. In some embodiments, the channels that represent a set of pixels (such as a tile) are stored in separate partitions of a memory. For example, values of the red channel of the set of pixels are stored in a first partition, values of the blue channel are stored in a second partition, values of the green channel are stored in a third partition, and values of the alpha channel are stored in a fourth partition. A compression algorithm is separately applied to the values of different channels of the pixel. In some embodiments, the data for the different channels stored in the memory partitions is read out and compressed separately. The compression ratios for the data stored in the different memory partitions is therefore determined by the entropy, locality, or amount of high frequency data of the values of the channels stored in the corresponding partitions. For example, a high entropy channel has a relatively low compression ratio and a low entropy channel has a relatively high compression ratio. Compressing the high entropy channel separately from the low entropy channel produces a higher overall compression ratio than would be achieved by compressing the combined high and low entropy channels.

In some embodiments, the compression algorithm identifies a portion of a tile that includes pixels that have the same value of a channel throughout the portion. For example, the compression algorithm can identify a 4 kilobyte (KB), 8 KB, or 16 kB section of a tile in which all the values of a channel of the pixels in the tile have the same value such as a value of 255 to indicate black or a value of 0 to indicate white. The compression algorithm represents the trivial values in the identified portion of the tile using information representing the trivial value, the channel, and the boundaries of the portion of the tile, which leads to compression ratios that can be orders of magnitude higher than standard compression values of 2:1, 4:1, or 8:1. In some embodiments, a texture lookup process stores trivial values in a random-access memory (RAM) that is implemented adjacent to a texture cache. If a wave of a single-instruction-multiple data (SIMD) instruction hits an entry in the trivial value RAM, a single lane is sampled and the resulting sampled value is broadcast to all the lanes. In some embodiments, texture data in different channels is fetched from the corresponding memory partitions separately from the other memory partitions to reduce overall bandwidth and provide better cache utilization for some operations.

FIG. 1 is a block diagram of a processing system 100 that compresses texture data on a per-channel basis according to some embodiments. The processing system 100 includes or has access to a memory 105 or other storage component that is implemented using a non-transitory computer readable medium such as a dynamic random-access memory (DRAM). However, in some cases, the memory 105 is implemented using other types of memory including static random-access memory (SRAM), nonvolatile RAM, and the like. The memory 105 is referred to as an external memory since it is implemented external to the processing units implemented in the processing system 100. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 also includes one or more parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like. In some embodiments of the processing system 100, the parallel processor is implemented as a graphics processing unit (GPU) 115 that renders images for presentation on a display 120. For example, the GPU 115 renders objects to produce values of pixels that are provided to the display 120, which uses the pixel values to display an image that represents the rendered objects. The GPU 115 implements a plurality of processor cores 121, 122, 123 (collectively referred to herein as "the processor cores 121-123") that execute instructions concurrently or in parallel. The number of processor cores 121-123 implemented in the GPU 115 is a matter of design choice and some embodiments of the GPU 115 include more or fewer processor cores than shown in FIG. 1. Some embodiments of the GPU 115 are used for general purpose computing. The GPU 115 executes instructions such as program code 125 stored in the memory 105 and the GPU 115 stores information in the memory 105 such as the results of the executed instructions.

The processing system 100 also includes a central processing unit (CPU) 130 that is connected to the bus 110 and therefore communicates with the GPU 115 and the memory 105 via the bus 110. The CPU 130 implements a plurality of processor cores 131, 132, 133 (collectively referred to herein as "the processor cores 131-133") that execute instructions concurrently or in parallel. The number of processor cores 131-133 implemented in the CPU 130 is a matter of design choice and some embodiments include more or fewer processor cores than illustrated in FIG. 1. The processor cores 131-133 execute instructions such as program code 135 stored in the memory 105 and the CPU 130 stores information in the memory 105 such as the results of the executed instructions. The CPU 130 is also able to initiate graphics processing by issuing draw calls to the GPU 115. Some embodiments of the CPU 130 implement multiple processor cores (not shown in FIG. 1 in the interest of clarity) that execute instructions concurrently or in parallel.

An input/output (I/O) engine 145 handles input or output operations associated with the display 120, as well as other elements of the processing system 100 such as keyboards, mice, printers, external disks, and the like. The I/O engine 145 is coupled to the bus 110 so that the I/O engine 145 communicates with the memory 105, the GPU 115, or the CPU 130. In the illustrated embodiment, the I/O engine 145 reads information stored on an external storage component 150, which is implemented using a non-transitory computer readable medium such as a compact disk (CD), a digital video disc (DVD), and the like. The I/O engine 145 is also able to write information to the external storage component 150, such as the results of processing by the GPU 115 or the CPU 130.

The cores 121-123 in the GPU 115 perform operations using texture data 155 stored in the memory 105. The texture data 155 includes information that represents a set of pixels (such as a tile). In some embodiments, the cores 121-123 or the GPU 115 implement caches to cache portions of the texture data 155 that are frequently used by one or more of the cores 121 123. Sampling circuitry 160 independently accesses channels of the texture data 155. In some embodiments, one or more of the cores 121 123 (or other compression circuitry) separately compress the channels of the texture data 155 and store compressed data representative of the channels of the texture data 155 for the set of pixels, e.g., in the memory 105 or associated caches. The channels can include a red channel, a blue channel, and a green channel that represent color values of the set of pixels and an alpha channel that represents degrees of transparency of the set of pixels. Storing the compressed data can include writing the compressed data to portions of a cache or other storage component. Some embodiments of the cores 121-123 identify a subset of the set of pixels that share a value of a first channel of the plurality of channels and represent the value of the first channel over the subset of the set of pixels using information representing the value, the first channel, and boundaries of the subset.

Figure 2:
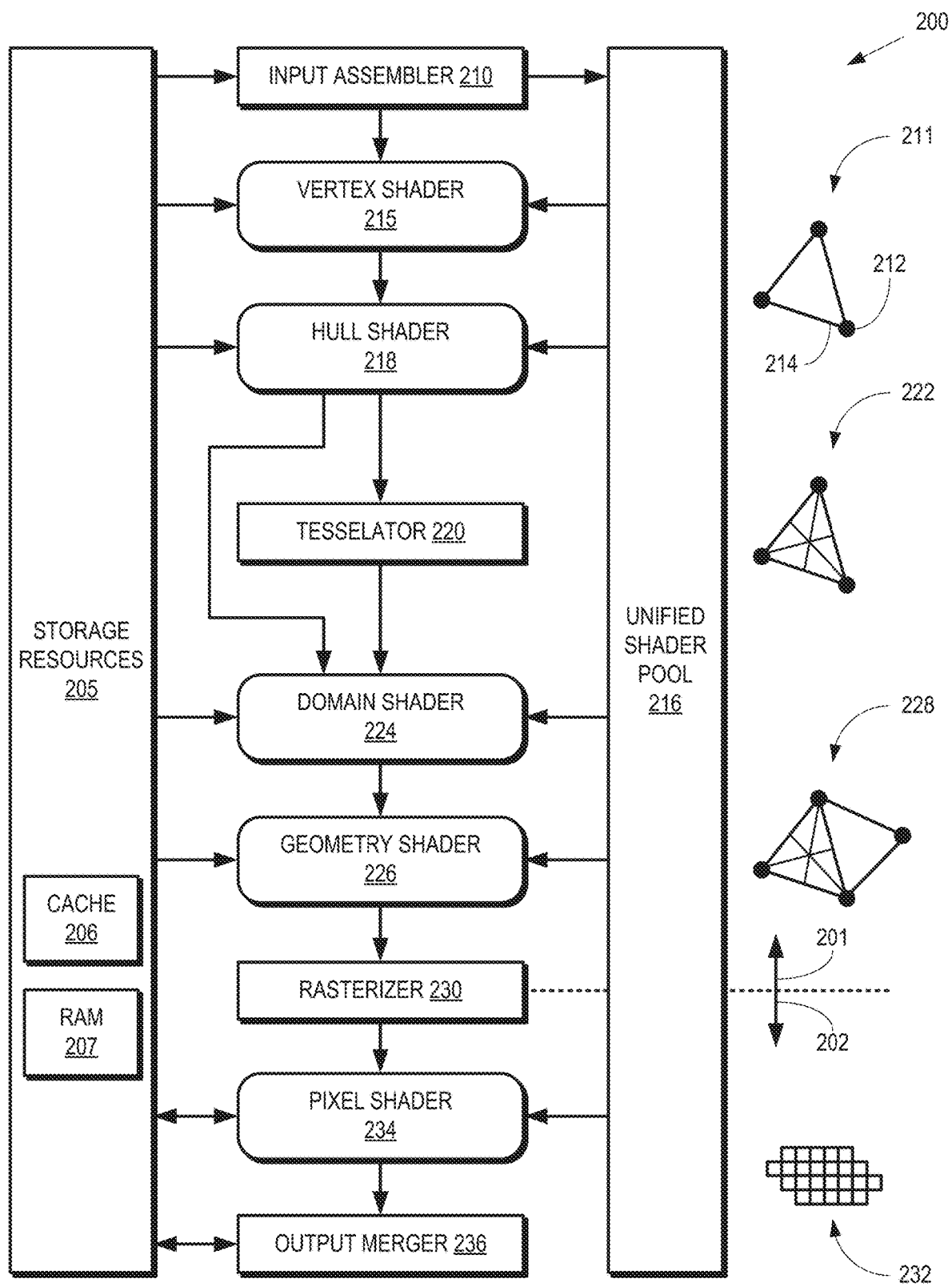
FIG. 2 depicts a graphics pipeline that is capable of processing high-order geometry primitives to generate rasterized images of three-dimensional (3D) scenes at a predetermined resolution and compressing texture data on a per-channel basis according to some embodiments.

FIG. 2 depicts a graphics pipeline 200 that is capable of processing high-order geometry primitives to generate rasterized images of three-dimensional (3D) scenes at a predetermined resolution and compressing texture data on a per-channel basis according to some embodiments. The graphics pipeline 200 is implemented in some embodiments of the GPU 115 shown in FIG. 1. The illustrated embodiment of the graphics pipeline 200 is implemented in accordance with the DX11 specification. Other embodiments of the graphics pipeline 200 are implemented in accordance with other application programming interfaces (APIs) such as Vulkan, Metal, DX12, and the like. The graphics pipeline 200 is subdivided into a geometry processing portion 201 that includes portions of the graphics pipeline 200 prior to rasterization and a pixel processing portion 202 that includes portions of the graphics pipeline 200 subsequent to rasterization.

The graphics pipeline 200 has access to storage resources 205 (also referred to herein as storage components) such as a hierarchy of one or more memories or caches that are used to implement buffers and store vertex data, texture data, and the like. The storage resources 205 are implemented using some embodiments of the system memory 105 shown in FIG. 1. Some embodiments of the storage resources 205 include (or have access to) one or more caches 206 and one or more RAM 207. Portions of the graphics pipeline 200 utilize texture data stored in the storage resources 205 to generate the rasterized images of 3D scenes. In some embodiments, the graphics pipeline 200 generates one or more intermediate textures during the rendering process, such as textures that have memory footprints of 8 MB to 64 MB. Texture data and intermediate textures are repeatedly read from the storage resources 205 and written back to the storage resources 205. Portions of the graphics pipeline 200 are therefore configured to compress and decompress texture data on a per-channel basis, as discussed herein.

An input assembler 210 accesses information from the storage resources 205 that are used to define objects that represent portions of a model of a scene. In some embodiments, accessing the information from the storage resources 205 includes decompressing compressed texture data that is stored in the storage resources 205, e.g., decompressing texture data that is cached in one or more lines of the cache 206. An example of a primitive is shown in FIG. 2 as a triangle 211, although other types of primitives are processed in some embodiments of the graphics pipeline 200. The triangle 211 includes one or more vertices 212 that are connected by one or more edges 214 (only one of each shown in FIG. 2 in the interest of clarity). The vertices 212 are shaded during the geometry processing portion 201 of the graphics pipeline 200.

A vertex shader 215, which is implemented in software in the illustrated embodiment, logically receives a single vertex 212 of a primitive as input and outputs a single vertex. Some embodiments of shaders such as the vertex shader 215 implement massive single-instruction-multiple-data (SIMD) processing so that multiple vertices are processed concurrently. The graphics pipeline 200 shown in FIG. 2 implements a unified shader model so that all the shaders included in the graphics pipeline 200 have the same execution platform on the shared massive SIMD compute units. The shaders, including the vertex shader 215, are therefore implemented using a common set of resources that is referred to herein as the unified shader pool 216.

A hull shader 218 operates on input high-order patches or control points that are used to define the input patches. The hull shader 218 outputs tessellation factors and other patch data. In some embodiments, primitives generated by the hull shader 218 are provided to a tessellator 220. The tessellator 220 receives objects (such as patches) from the hull shader 218 and generates information identifying primitives corresponding to the input object, e.g., by tessellating the input objects based on tessellation factors provided to the tessellator 220 by the hull shader 218. Tessellation subdivides input higher-order primitives such as patches into a set of lower-order output primitives that represent finer levels of detail, e.g., as indicated by tessellation factors that specify the granularity of the primitives produced by the tessellation process. A model of a scene is therefore represented by a smaller number of higher-order primitives (to save memory or bandwidth) and additional details are added by tessellating the higher-order primitive. In the illustrated embodiment, the tessellator 220 generates primitives 222 by tessellating the triangle 211.

A domain shader 224 inputs a domain location and (optionally) other patch data. The domain shader 224 operates on the provided information and generates a single vertex for output based on the input domain location and other information. A geometry shader 226 receives an input primitive and outputs up to four primitives that are generated by the geometry shader 226 based on the input primitive. In the illustrated embodiment, the geometry shader 226 generates the output primitives 228 based on the tessellated primitive 222.

One stream of primitives is provided to a rasterizer 230 and, in some embodiments, up to four streams of primitives are concatenated to buffers in the storage resources 205. The rasterizer 230 performs shading operations and other operations such as clipping, perspective dividing, scissoring, and viewport selection, and the like. The rasterizer 230 generates a set 232 of pixels that are subsequently processed in the pixel processing portion 202 of the graphics pipeline 200. In some embodiments, the set 232 of pixels includes one or more tiles.

In the illustrated embodiment, a pixel shader 234 inputs a pixel flow (e.g., including the set 232 of pixels) and outputs zero or another pixel flow in response to the input pixel flow. An output merger block 236 performs blend, depth, stencil, or other operations on pixels received from the pixel shader 234.

Some or all the shaders in the graphics pipeline 200 perform texture mapping using texture data that is stored in the storage resources 205. For example, the pixel shader 234 can read texture data from the storage resources 205 and use the texture data to shade one or more pixels. The shaded pixels are then provided to a display for presentation to a user.

Figure 3:
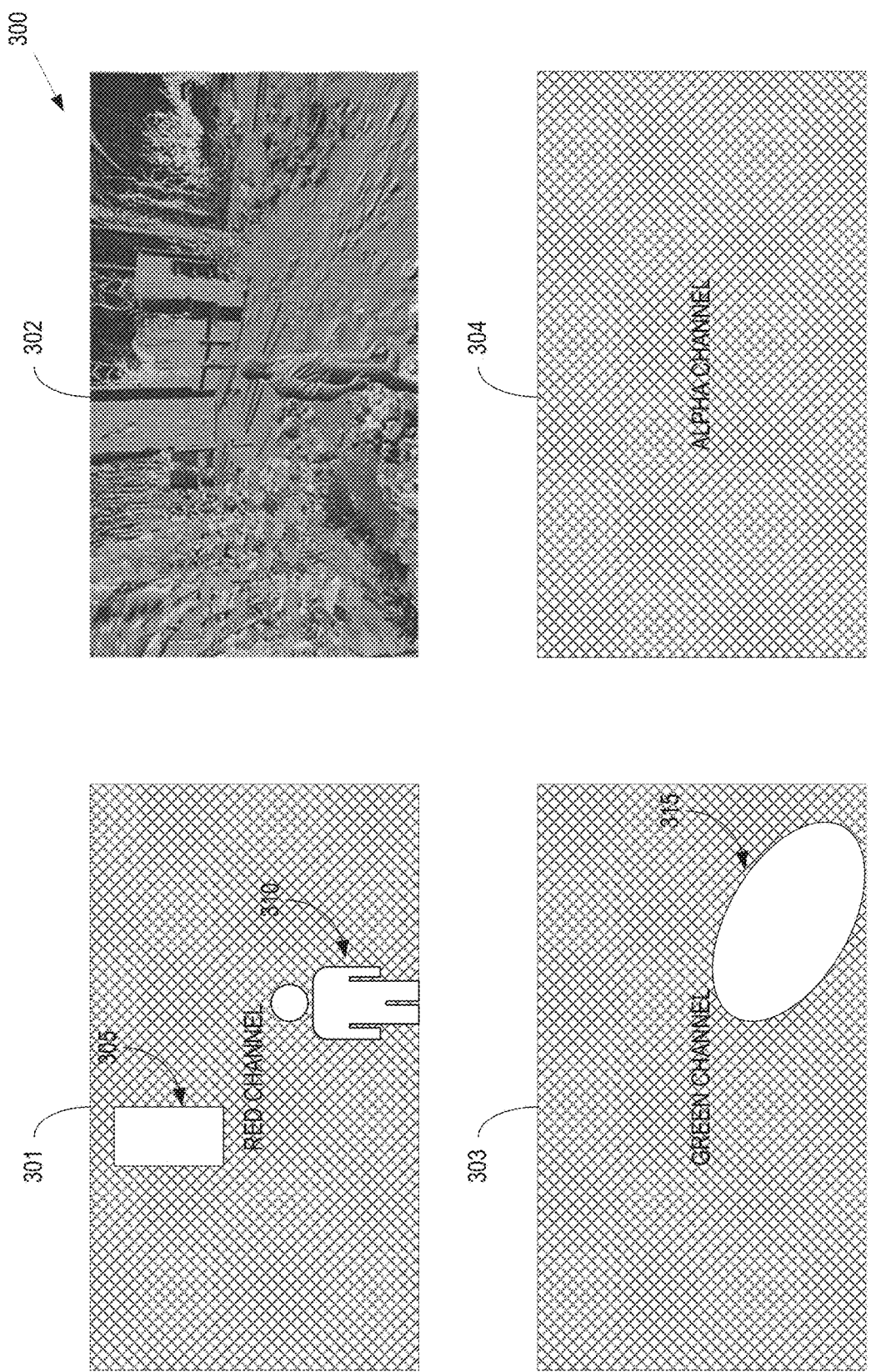
FIG. 3 is a block diagram of texture data that is partitioned into multiple channels according to some embodiments.

FIG. 3 is a block diagram of texture data 300 that is partitioned into multiple channels according to some embodiments. In the illustrated embodiment, the texture data 300 includes a red channel 301, a blue channel 302, a green channel 303, and an alpha channel 304 that represents degrees of transparency of the pixels in the texture data 300. In some embodiments, the texture data 300 represents a tile in an image of a 3D scene that is rendered by a graphics pipeline such as the graphics pipeline 200 shown in FIG. 2. The channels 301-304 have different characteristics that affect the compression efficiency of the information in each of the channels 301-304. For example, representation of walls 305 and a torso 310 of a character in the red channel 301 include values that are noisy and therefore result in small compression ratios or inability to compress the data at all. For another example, a representation of a floor 315 in the green channel 303 is noisy and therefore difficult to compress efficiently. In contrast, the values of the pixels in the blue channel 302 and the alpha channel 304 exhibit high degrees of locality (or include less high frequency data) and compression algorithms applied to the blue channel 302 and the alpha channel 304 generate compress data with higher compression ratios. Independently accessing and separately compressing the channels 301-304 therefore results in a higher overall compression efficiency and compressing the combined information in the channel 301-304.

Figure 4:
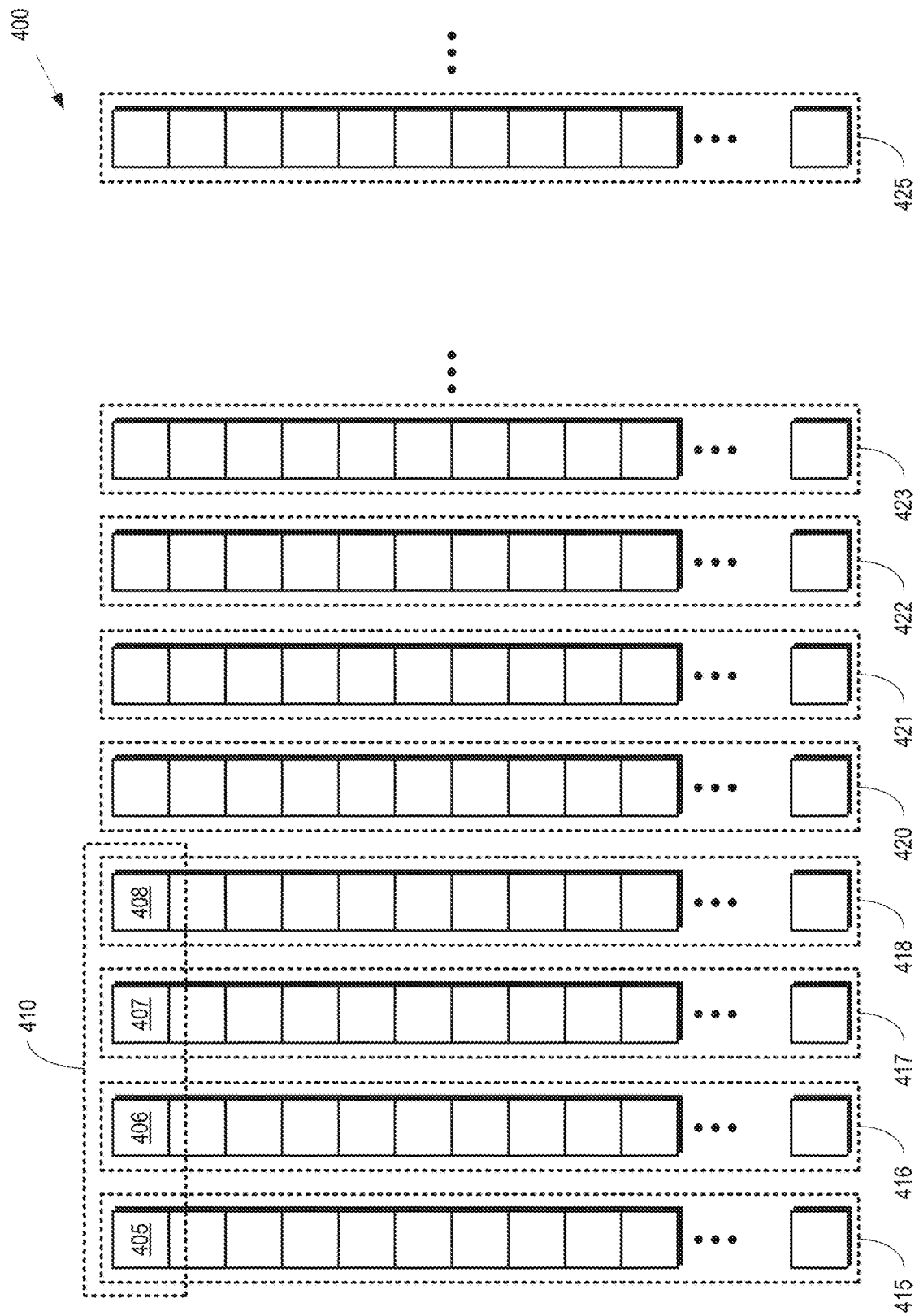
FIG. 4 is a block diagram of a memory layout for pixels of texture data according to some embodiments.

FIG. 4 is a block diagram of a memory layout 400 for pixels of texture data according to some embodiments. The memory layout 400 includes values 405, 406, 407, 408 of channels for each of the pixels 410 (only channel values for one pixel indicated by reference numeral in the interest of clarity). In the illustrated embodiment, the value 405 represent a value of the red channel of corresponding pixel 410, the value 406 represents a value of the blue channel of the corresponding pixel 410, the value 407 represents a value of the green channel of the corresponding pixel 410, and the value 408 represents a value of the alpha channel of the corresponding pixel 410. The pixels and the corresponding values are stored sequentially in the memory layout 400. Consequently, the values for the different channels are spread throughout the memory layout 400. For example, values of the red channel for the pixels are stored in the columns 415, 420, 425 of the memory layout 400, values of the blue channel for the pixels are stored in the columns 416, 421 of the memory layout 400, values of the green channel for the pixels are stored in the columns 417, 422 of the memory layout 400, and values of the alpha channel for the pixels are stored in the columns 418, 423 of the memory layout 400. Distributing the values for the different channels around the memory layout 400 in this manner increases the overall bandwidth used to fetch the channel separately and reduces cache utilization due to fetching extraneous channels.

Figure 5:
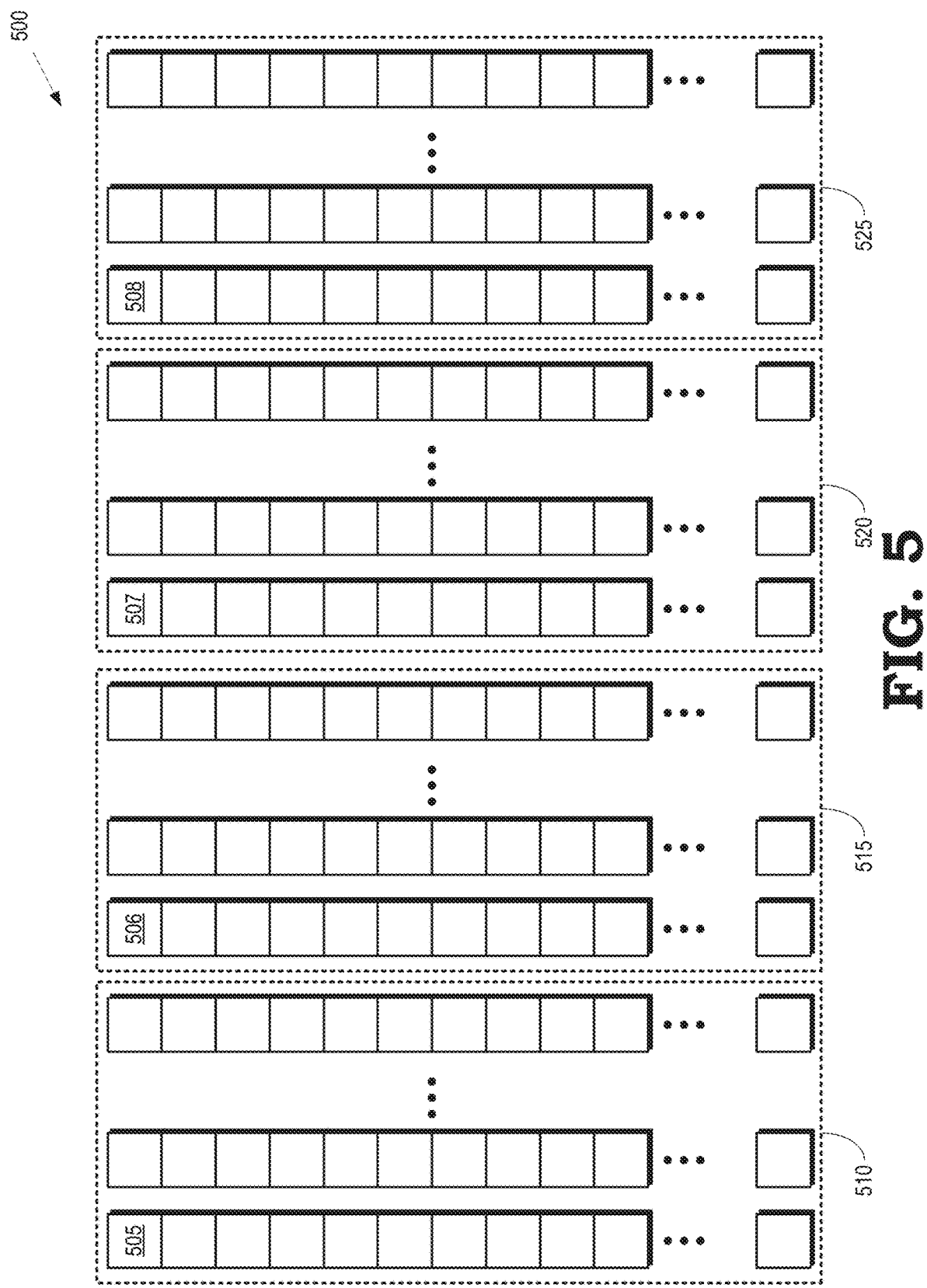
FIG. 5 is a block diagram of a memory layout that partitions texture data on a per-channel basis according to some embodiments.

FIG. 5 is a block diagram of a memory layout 500 that partitions texture data on a per-channel basis according to some embodiments. The memory layout 500 includes values 505, 506, 507, 508 of channels for a pixel (only channel values for one pixel indicated by reference numeral in the interest of clarity). In the illustrated embodiment, the value 505 represent a value of the red channel of corresponding pixel, the value 506 represents a value of the blue channel of the corresponding pixel, the value 507 represents a value of the green channel of the corresponding pixel, and the value 508 represents a value of the alpha channel of the corresponding pixel. The values of the different channels for the different pixels are separated into different partitions. In the illustrated embodiment, the partition 510 includes values of the red channel of the pixels, the partition 515 includes values of the blue channel of the pixels, the partition 520 includes values of the green channel of the pixels, and the partition 525 includes values of the alpha channel of the pixels. Partitioning the values for the different channels in this manner improves data locality and decreases the overall bandwidth used to fetch the channels. Partitioning also improves cache utilization in embodiments that associate different portions of the cache with the partitions 510, 515, 520, 525, as discussed herein.

Figure 6:
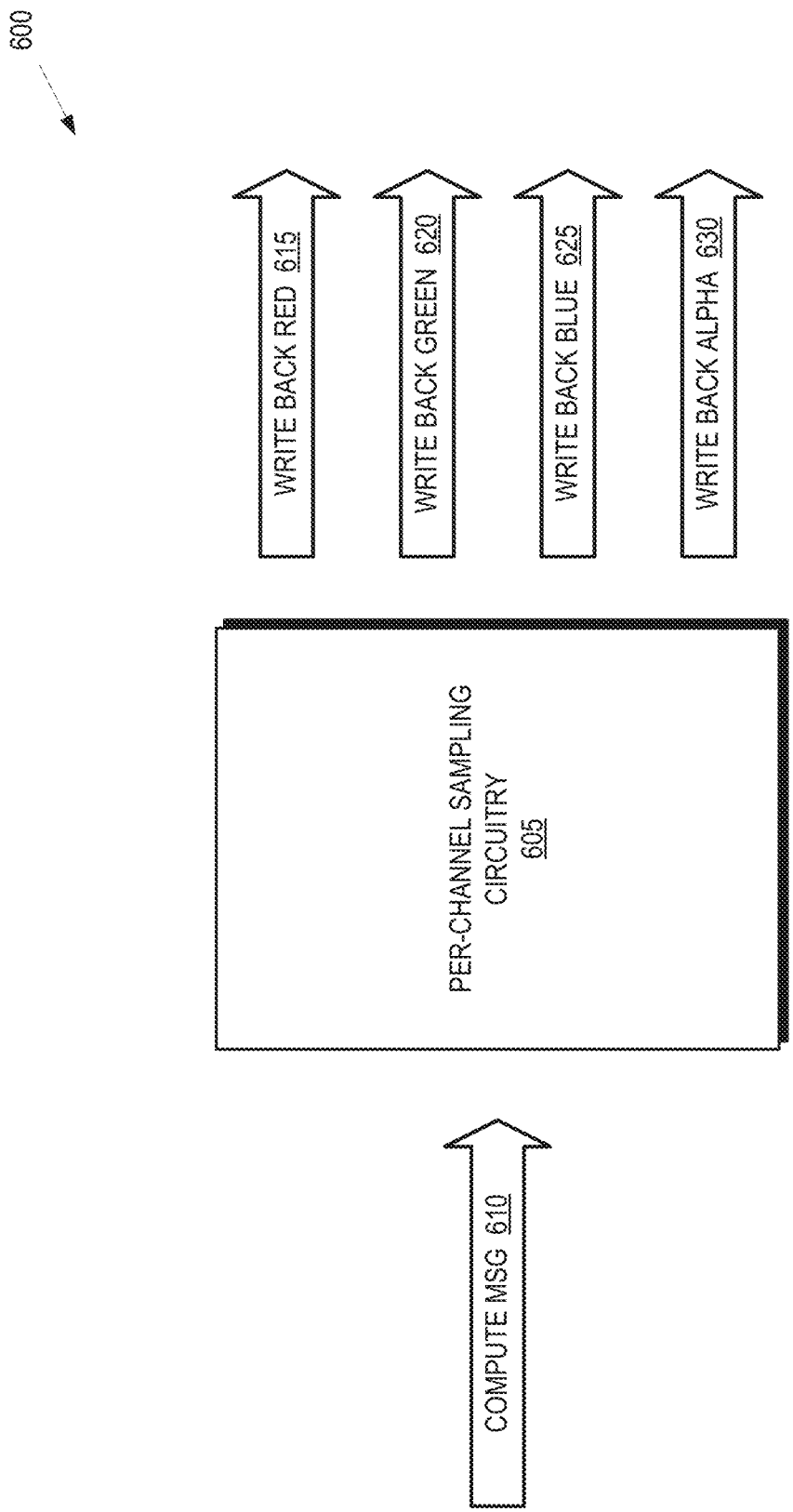
FIG. 6 is a block diagram of a portion of a processing unit that samples texture data on a per-channel basis according to some embodiments.

FIG. 6 is a block diagram of a portion 600 of a processing unit that samples texture data on a per-channel basis according to some embodiments. The portion 600 of the processing unit includes per-channel sampling circuitry 605 that independently samples different channels of texture data, e.g., from storage component such as a memory or a cache. The per-channel sampling circuitry 605 is used to implement some embodiments of the sampling circuitry 160 shown in FIG. 1 and in some embodiments of the graphics pipeline 200 shown in FIG. 2.

The per-channel sampling circuitry 605 samples one or more channels of the texture data in response to receiving a compute message 610. In some embodiments, the compute message 610 is received from a CPU such as the CPU 130 shown in FIG. 1 or from entities within a GPU such as the GPU 115 shown in FIG. 1. In response to receiving the compute message 610, the per-channel sampling circuitry 605 independently reads texture data and provides the texture data to one or more processor cores (such as the cores 121-123 shown in FIG. 1) or entities in a graphics pipeline such as the graphics pipeline 200 shown in FIG. 2. Some embodiments of the per-channel sampling circuitry 605 read the texture data from partitions of a storage component such as a memory or a cache that are dedicated to storing the corresponding channel of the texture data. For example, the per-channel sampling circuitry 605 can read red channel texture data from the partition 510 shown in FIG. 5, blue channel texture data from the partition 515 shown in FIG. 5, green channel texture data from the partition 520 shown in FIG. 5, and alpha channel texture data from the partition 525 shown in FIG. 5.

The per-channel sampling circuitry 605 also writes compressed texture data back to the memory or cache on a per-channel basis. The compressed texture data is received from one or more processor cores (such as the cores 121-123 shown in FIG. 1), entities in a graphics pipeline such as the graphics pipeline 200 shown in FIG. 2, or compression circuitry associated with these entities. Some embodiments of the per-channel sampling circuitry 605 right the compressed texture data to partitions of a memory or cache that are dedicated to storing the corresponding channel of the texture data. For example, the per-channel sampling circuitry 605 can write red channel texture data 615 to the partition 510 shown in FIG. 5, blue channel texture data 620 to the partition 515 shown in FIG. 5, green channel texture data 625 to the partition 520 shown in FIG. 5, and alpha channel texture data 630 to the partition 525 shown in FIG. 5.

Figure 7:
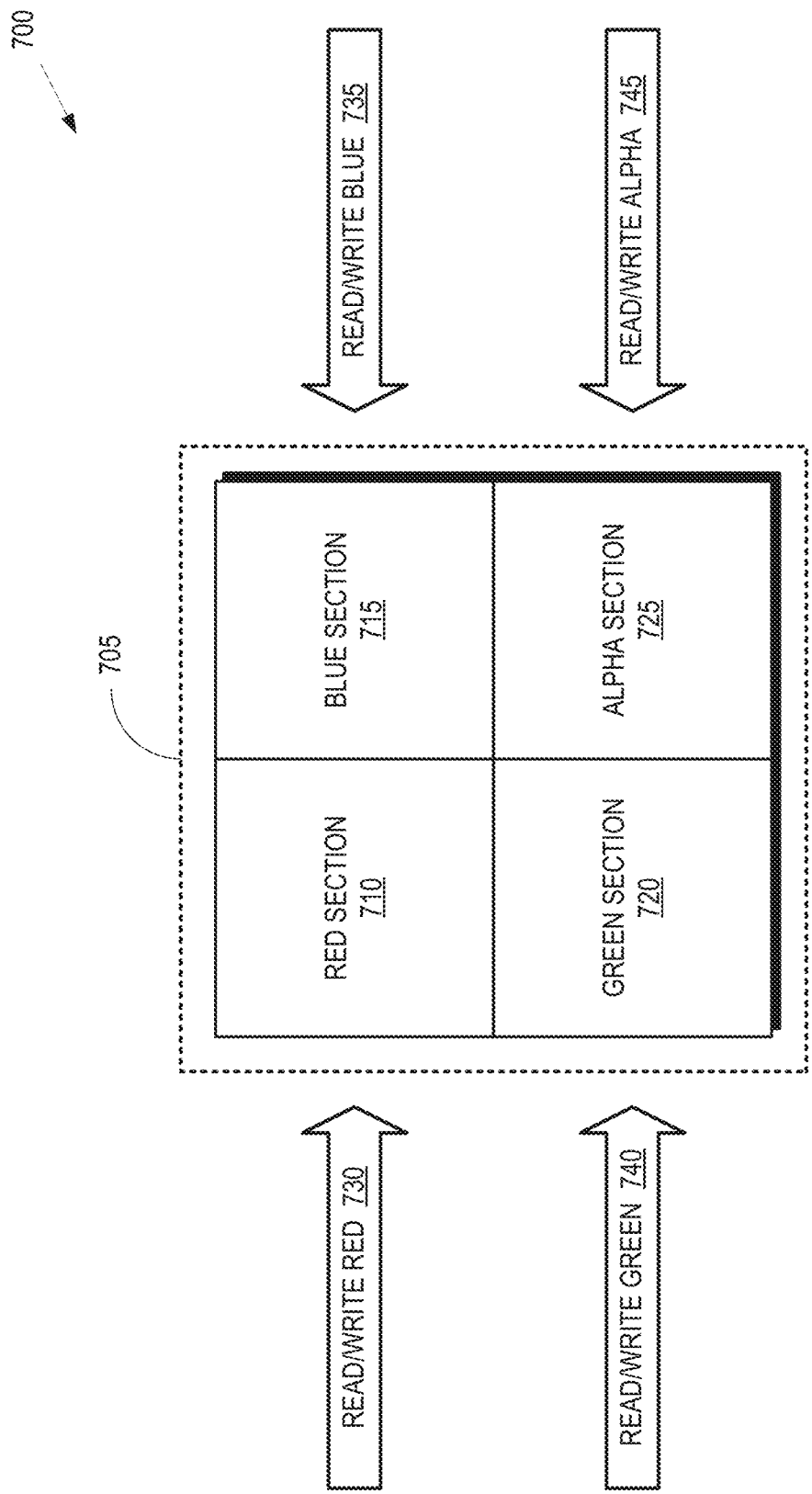
FIG. 7 is a block diagram of a portion of a processing system that caches texture data on a per-channel basis according to some embodiments.

FIG. 7 is a block diagram of a portion 700 of a processing system that caches texture data on a per-channel basis according to some embodiments. The portion 700 of the processing system includes a cache 705 that is partitioned to store different channels of texture data in different regions, portions, or partitions of the cache 705. The cache 705 is used to implement some embodiments of the cache 206 use by the graphics pipeline 200 shown in FIG. 2. In the illustrated embodiment, the cache 705 is partitioned into a red section 710, a blue section 715, a green section 720, and an alpha section 725 that are used to cache frequently used values of the corresponding channels of the texture data. The sections 710, 715, 720, 725 received corresponding memory access requests including read/write requests 730 to the red channel texture data stored in the section 710, read/write requests 735 to the blue channel texture data stored in the section 715, read/write requests 740 to the green channel texture data stored in the section 720, and read/write requests 745 to the blue channel texture data stored in the section 725.

Figure 8:
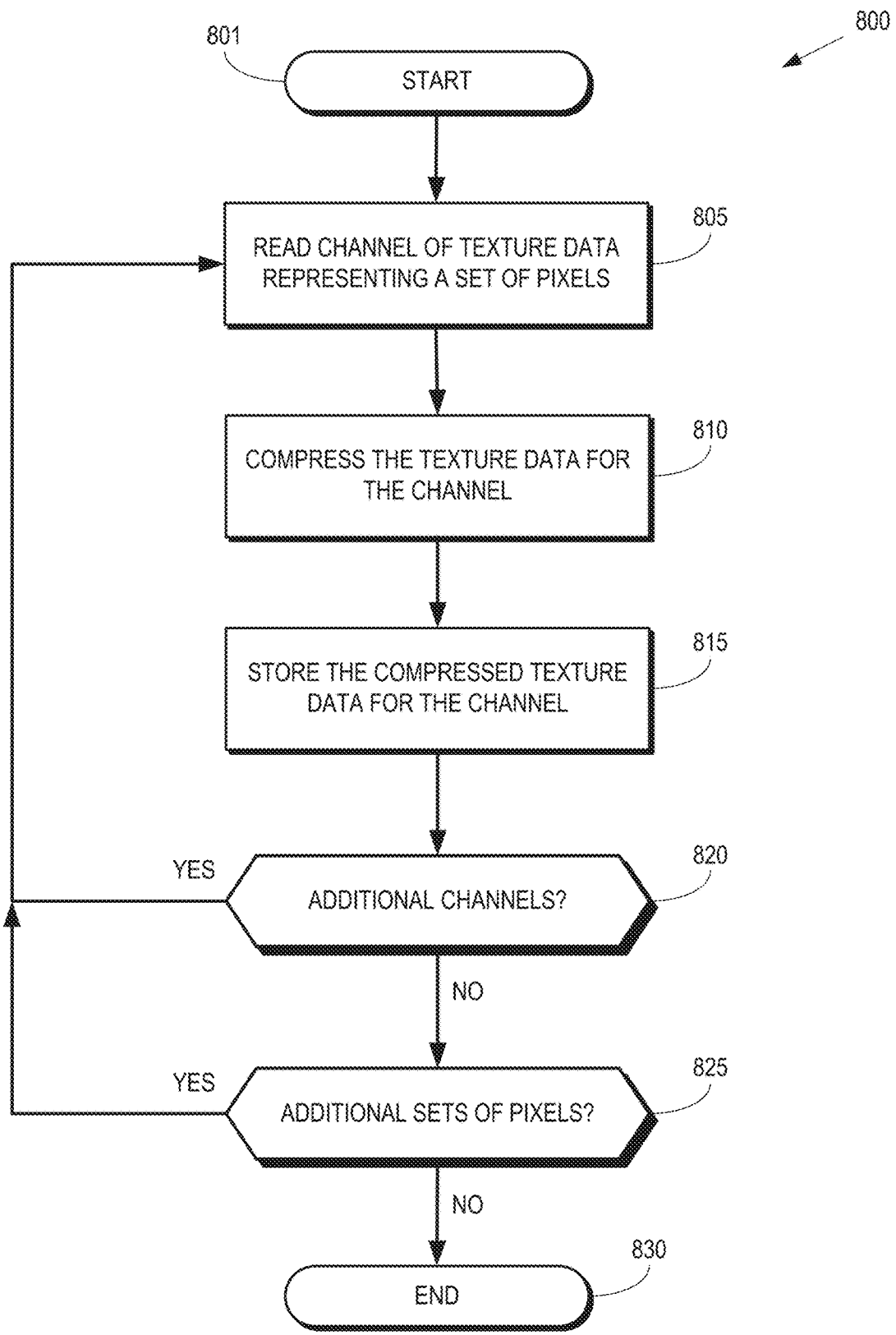
FIG. 8 is a flow diagram of a method of independently accessing channels of texture data and separately compressing the channels of the texture data according to some embodiments.

FIG. 8 is a flow diagram of a method 800 of independently accessing channels of texture data and separately compressing the channels of the texture data according to some embodiments. The method 800 is implemented in some embodiments of the processing system 100 shown in FIG. 1 in the graphics pipeline 200 shown in FIG. 2.

The method 800 starts at the block 801. At block 805, a channel of texture data representing a set of pixels (such as a tile) is read from a memory or cache. In some embodiments, per-channel sampling circuitry such as the per-channel sampling circuitry 605 shown in FIG. 6 is used to sample the channel of the texture data.

At block 810, the sampled values of the channel of the texture data that represent the set of pixels are compressed. In some embodiments, the sampled values are compressed using first-order difference equations. One pixel is selected as a reference pixel for the channel and differences (referred to herein as delta values) between a base value of the channel of the reference pixel and the values of the channel in other pixels are calculated. The number of bits required to encode the largest delta value (e.g., the worst-case residue bits) is calculated and used to determine how to represent the delta values in memory. The compressed data includes information indicating the value of the channel of the reference pixel, the delta values, and the number of bits used to encode the delta values. As discussed herein, trivial values of a channel that are common to blocks or groups of pixels are compressed at a higher compression ratio using other compression techniques.

At block 815, the compressed texture data for the channel is stored, e.g., by writing the compressed texture data back to a memory or a cache.

At decision block 820, the sampling circuitry determine whether there are additional channels of the set of pixels that have not yet been compressed. If so, the method 800 flows back to the block 805. If there are no additional channels for the set of pixels, the method 800 flows to decision block 825.

At decision block 825, the sampling circuitry determines whether there are additional sets of pixels to be compressed. If so, the method 800 flows back to the block 805 and begins independently sampling the channels for the additional set of pixels. If there are no additional sets of pixels to be compressed, the method 800 flows to the block 830 and the method 800 ends.

Figure 9:
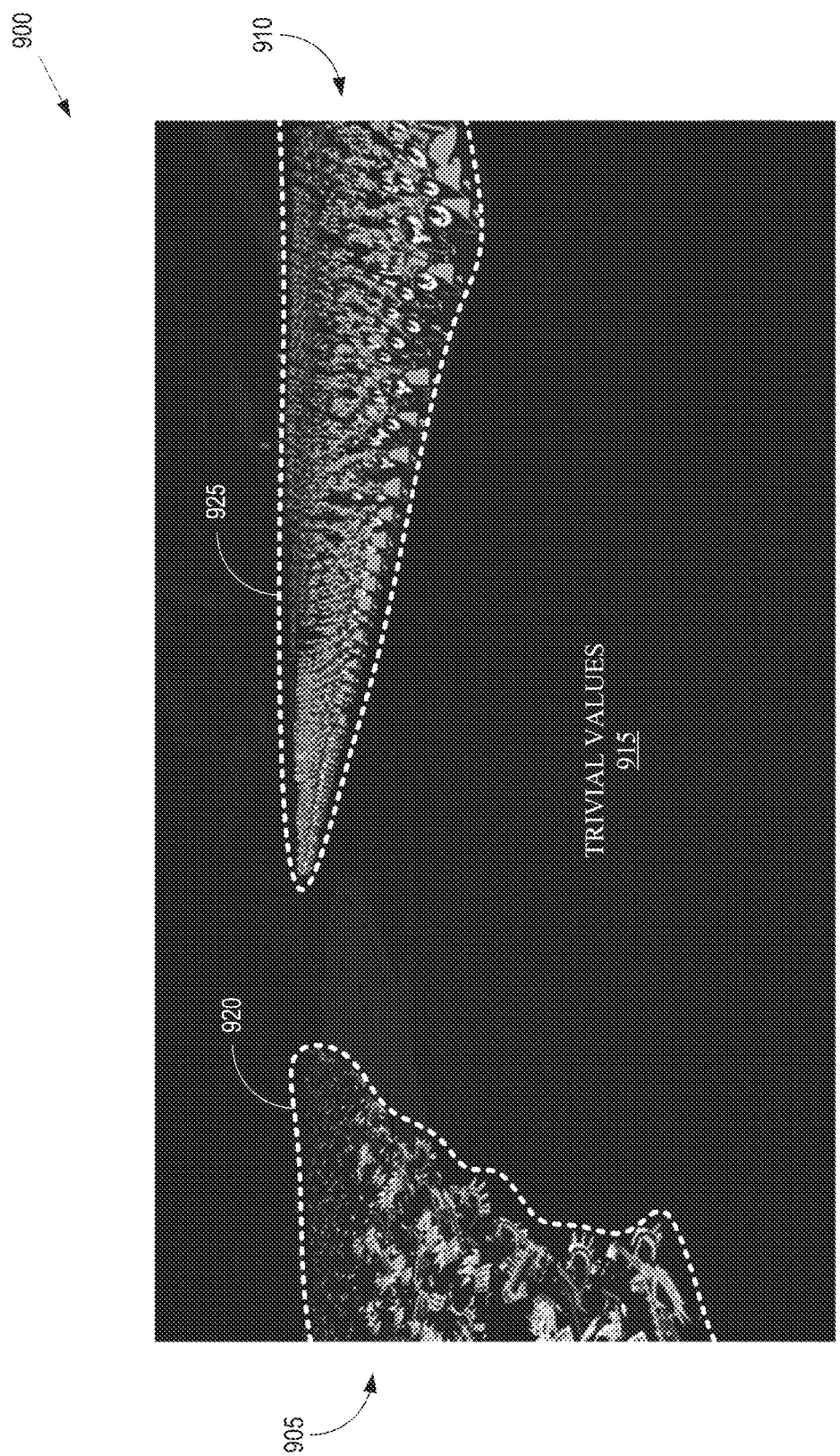
FIG. 9 is an image of values of a channel for a set of pixels according to some embodiments.

FIG. 9 is an image 900 of values of a channel for a set of pixels according to some embodiments. For example, the image 900 can represent values of a red channel of the set of pixels. The image 900 includes regions 905, 910 that include a significant amount of high-frequency texture data. The regions 905, 910 are therefore compressed using conventional compression algorithms that produce compression ratios of 2:1, 4:1, 8:1, and the like. The image 900 also includes a region 915 that is represented by a single, or trivial value that is shared or in common to all of the pixels in the region 915, e.g., a value of 0, which corresponds to black. A very high degree of compression (e.g., much greater than 8:1) is achieved by separately compressing the values of the channel of the pixels in the region 915 that have the common, trivial value. In some embodiments, the values of the channels of the pixels in the region 915 are represented by the trivial value and information indicating the boundaries 920, 925 of the region 915.

Figure 10:
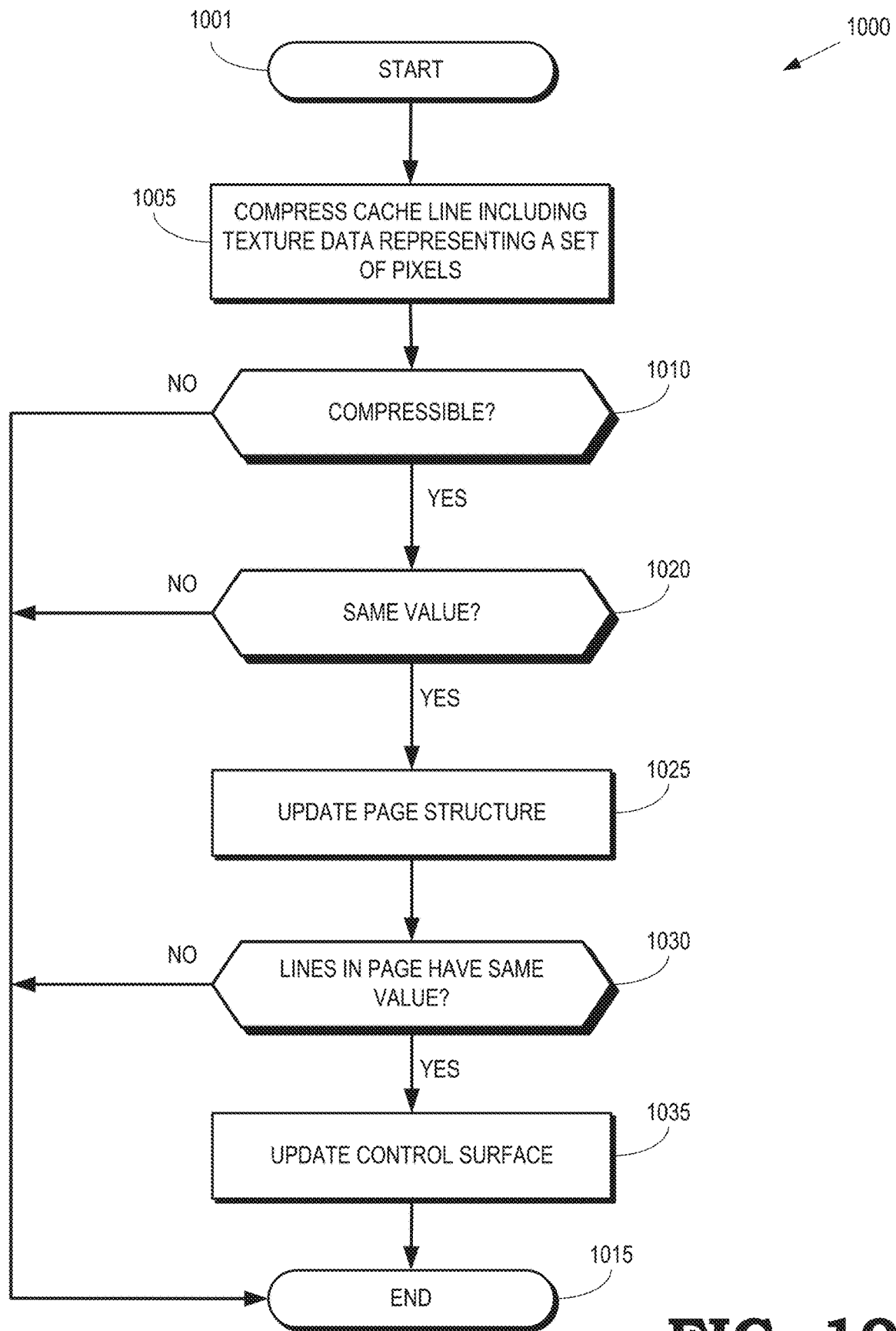
FIG. 10 is a flow diagram of a method of independently accessing channels of texture data and separately compressing trivial values of the channels of the texture data according to some embodiments.

FIG. 10 is a flow diagram of a method 1000 of independently accessing channels of texture data and separately compressing trivial values of the channels of the texture data according to some embodiments. The method 1000 is implemented in some embodiments of the processing system 100 shown in FIG. 1 in the graphics pipeline 200 shown in FIG. 2.

The method 1000 begins at the block 1001. At block 1005, a processing unit or dedicated compression circuitry attempt to compress a cache line including texture data representing values of a channel of a set of pixels using a conventional compression algorithm. Based on the information in the cache line, the processing unit (or compression circuitry) determines (at decision block 1010) whether the information in the cache line is compressible. If not, the method 1000 flows to the block 1015 and the method 1000 ends. If the values in the cache line are compressible, the method 1000 flows to decision block 1020.

At decision block 1020, the processing unit (or compression circuitry) determines whether the values in the cache line are the same, e.g., a common value is shared by the values of the channel of the texture data in the cache line. In some embodiments, an exclusive-OR comparison is performed on the double word (DWord) read from the cache line to determine whether the values in the cache line are all the same. If not, the method 1000 flows to the block 1015 and the method 1000 ends. If the values in the cache line are the same, the method 1000 flows to block 1025.

At block 1025, the processing unit (or compression circuitry) updates a page structure associated with the values of the channel of the texture data. In some embodiments, a bookkeeping structure (e.g., a buffer) for a page of N×M pixels is updated.

At decision block 1030, the processing unit (or compression circuitry) determines whether all the lines in the page have the same value, e.g., the common value shared by entries in the cache line. If not, the method 1000 flows to the block 1015 and the method 1000 ends. If the values in the page are the same, the method 1000 flows to block 1035.

At block 1035, the processing unit updates a control surface to indicate that the values in the page are the same. In some embodiments, the control services updated to indicate that the page of N×M pixels has the same values for the channel associated with the page. The method 1000 then flows to the block 1015 and the method 1000 ends.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Moreover, the particular embodiments disclosed above are illustrative only, as the disclosed subject matter can be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method for decompressing images at a processor, the method comprising:
    retrieving compressed texture data that is representative of a plurality of channels of texture data for a set of pixels;
    separately decompressing the compressed texture data into the plurality of channels; and
    storing the plurality of channels of the texture data that represent a set of pixels at a storage component.

2. The method of claim 1, wherein retrieving the plurality of channels of the texture data comprises retrieving at least a red channel, a blue channel, and a green channel that represent color values of the set of pixels and an alpha channel that represents degrees of transparency of the set of pixels.

3. The method of claim 1, further comprising:
    the storage component, wherein:
        storing the plurality of channels of the texture data comprises storing the plurality of channels of the texture data at memory partitions of the storage component, the memory partitions associated with the plurality of channels.

4. The method of claim 3, wherein:
    the storage component comprises a cache; and
    storing the plurality of channels of the texture data comprises storing the plurality of channels of the texture data at portions of the cache, and wherein the portions of the cache are associated with the memory partitions.

5. The method of claim 4, wherein:
    retrieving the compressed texture data comprises accessing the compressed texture data that is representative of the plurality of channels from the portions of the cache associated with the plurality of channels.

6. The method of claim 1, wherein the plurality of channels of the texture data are compressed at different compression ratios determined by at least one of entropy in the plurality of channels of the texture data, locality in the plurality of channels of the texture data, or an amount of high-frequency texture data in the plurality of channels.

7. The method of claim 1, further comprising:
    accessing the plurality of channels of texture data that represent the set of pixels; and
    prior to retrieving the compressed texture data, separately compressing the plurality of channels of the texture data into the compressed texture data.

8. The method of claim 7, further comprising:
    prior to retrieving the compressed texture data, storing the compressed texture data at the storage component.

9. An apparatus comprising:
    sampling circuitry configured to independently access a plurality of channels of texture data that represent a set of pixels; and at least one processing unit configured to retrieve compressed texture data that is representative of the plurality of channels of the texture data for the set of pixels and to separately decompress the compressed texture data into the plurality of channels.

10. The apparatus of claim 9, wherein the sampling circuitry is configured to independently access a red channel, a blue channel, and a green channel that represent color values of the set of pixels and an alpha channel that represents degrees of transparency of the set of pixels.

11. The apparatus of claim 9, wherein the sampling circuitry is configured to access the plurality of channels of the texture data from memory partitions associated with the plurality of channels.

12. The apparatus of claim 11, further comprising:
a cache that is partitioned into portions associated with the memory partitions, wherein the sampling circuitry is configured to access the plurality of channels of the texture data from the portions.

13. The apparatus of claim 12, wherein the at least one processing unit is configured to read the compressed texture data that is representative of the plurality of channels from the respective portions of the cache.

14. The apparatus of claim 9, wherein the plurality of channels of the texture data are compressed at different compression ratios determined by at least one of entropy in the plurality of channels of the texture data, locality in the plurality of channels of the texture data, or an amount of high-frequency texture data in the plurality of channels.

15. The apparatus of claim 9, wherein the at least one processing unit is configured to separately compress the plurality of channels of the texture data into the compressed texture data prior to retrieving the compressed texture data.

16. The apparatus of claim 15, wherein the at least one processing unit is configured to store the compressed texture data prior to retrieving the compressed texture data.

17. A method comprising:
retrieving first compressed texture data that is representative of first values of a first channel of a plurality of channels of texture data that represent a set of pixels;
decompressing the first compressed texture data into the first channel of the plurality of channels;
retrieving second compressed texture data that is representative of second values of a second channel of the plurality of channels;
decompressing the second compressed texture data into the second channel of the plurality of channels separately from decompressing the first compressed texture data; and
storing first data that is representative of the first channel and second data that is representative of the second channel.

18. The method of claim 17, wherein retrieving the first compressed texture data comprises retrieving the first compressed texture data from a first partition of memory, and wherein retrieving the second compressed texture data comprises retrieving the second compressed texture data from a second partition of the memory.

19. The method of claim 18, further comprising:
reading the first compressed texture data and the second compressed texture data from first and second portions of a cache, respectively; and
writing the first data and the second data to the first and second portions of the cache, respectively.

20. The method of claim 17, further comprising:
accessing the plurality of channels of texture data that represent the set of pixels;
compressing the first channel of the plurality of channels of the texture data into the first compressed texture data;
compressing the second channel of the plurality of channels of the texture data into the second compressed texture data separately from compressing the first channel; and
storing the first compressed texture data and the second compressed texture data.

* * * * *